United States Patent [19]

Carson et al.

[11] Patent Number: 5,409,967
[45] Date of Patent: Apr. 25, 1995

[54] AMORPHOUS, AROMATIC POLYESTER CONTAINING IMPACT MODIFIER

[75] Inventors: William G. Carson, Moorestown, N.J.; Choung-Houng Lai, Newtown; Edward J. Troy, Bristol, both of Pa.

[73] Assignee: Rohm and Haas Company, Philadelphia, Pa.

[21] Appl. No.: 216,199

[22] Filed: Mar. 22, 1994

Related U.S. Application Data

[60] Division of Ser. No. 32,939, Mar. 17, 1993, Pat. No. 5,321,056, which is a continuation-in-part of Ser. No. 901,327, Jun. 19, 1992, abandoned.

[51] Int. Cl.$^6$ ............... C08F 212/08; C08F 220/00; C08L 51/04
[52] U.S. Cl. ................... 523/201; 525/64; 525/66; 525/67; 525/303; 525/308; 525/902; 524/504
[58] Field of Search .............. 523/201; 525/64, 67, 525/303, 308, 902, 66; 524/504

[56] References Cited

U.S. PATENT DOCUMENTS

| | | | |
|---|---|---|---|
| 3,793,402 | 12/1974 | Owens | 525/902 |
| 3,971,835 | 7/1976 | Myers et al. | 260/876 |
| 4,034,013 | 7/1977 | Lane | 260/835 |
| 4,117,034 | 9/1978 | Steffancin | 260/873 |
| 4,180,494 | 12/1979 | Fromuth et al. | 525/67 |
| 4,417,026 | 11/1983 | Lindner et al. | 525/64 |
| 4,563,503 | 1/1986 | Witman et al. | 525/148 |
| 4,607,075 | 8/1986 | Baum et al. | 524/449 |
| 4,659,767 | 4/1987 | Dunkle et al. | 524/504 |
| 4,677,150 | 6/1987 | Chacko et al. | 524/449 |
| 4,707,513 | 11/1987 | Baer | 524/504 |
| 4,753,986 | 6/1988 | Wang | 525/64 |
| 4,939,201 | 7/1990 | Seiler et al. | 525/504 |
| 4,968,731 | 11/1990 | Lausberg et al. | 523/436 |
| 5,006,592 | 4/1991 | Oshima et al. | 524/504 |
| 5,106,097 | 4/1992 | Boutini | 525/67 |
| 5,280,075 | 1/1994 | Oshima et al. | 523/201 |

FOREIGN PATENT DOCUMENTS 445601 9/1991 European Pat. Off. .
54-48850 4/1979 Japan .

Primary Examiner—Paul R. Michl
Assistant Examiner—Olga Asinovsky
Attorney, Agent, or Firm—Roger K. Graham

[57] ABSTRACT

Impact modifiers which produce transparent, high notched Izod impact strength blends with amorphous, aromatic polyesters are described. The impact modifiers are core-shell polymers with cores comprised mainly of rubbery polymers of diolefins and vinyl aromatic monomers and shells comprised mainly of styrene copolymers (e.g. styrene and hydroxyalkyl (meth)acrylate).

13 Claims, No Drawings

AMORPHOUS, AROMATIC POLYESTER CONTAINING IMPACT MODIFIER

This is a divisional of application Ser. No. 32,939, filed 17 Mar. 1993, now U.S. Pat. No. 5,321,056 which is a continuation-in-part of U.S. application Ser. No. 07/901,327, filed Jun. 19, 1992, now abandoned.

FIELD OF INVENTION

This invention relates to polymer compositions for improving impact strength of clear, amorphous aromatic polyester, processes therein, and improved polyester blends, and articles produced therefrom.

BACKGROUND OF THE INVENTION

The present invention concerns an impact modifier composition which significantly improves the notched impact resistance while maintaining clarity of an amorphous aromatic polyester resin (hereafter referred to as polyester). More specifically, the present invention concerns an impact modifier composition which contains a rubber) polymer and a polymer containing a hydroxyl group or another functional group which acts in a similar manner as the hydroxyl group.

Polyesters (e.g., polyethylene terephthalate, polybutylene terephthalate, etc.) exhibit various excellent properties such as resistance to temperature, chemicals, weathering, radiation and burning and also exhibit excellent clarity (in amorphous form), reasonable cost, as well as moldability. Accordingly, polyesters are used for various purposes (e.g., fibers, films, molded and extruded products, etc.) The notched impact resistance of the polyester, however, is less than satisfactory. Plastics such as poly(butylene terephthalate) (PBT) and poly(ethylene terephthalate) (PET) have insufficient notched impact strength, and many attempts have been made to improve the impact strength. Many agents have been proposed to improve the impact strength. These are added to resins and subjected to melt-blending. In particular, when a cut (notch) is created in a molded or extruded part, the impact resistance of polyester is poor, and consequently notched impact strength must be further improved for polyester articles.

Various attempts have been made using conventional fibrous inorganic fillers (e.g., glass fiber, asbestos fiber, etc.) to improve the impact resistance of polyester. Even when these methods are implemented, however, the impact resistance improvement is less than satisfactory and clarity in amorphous polyesters is adversely affected.

Various techniques wherein rubbery polymers or rubber-containing polymers are mixed with polyesters have been developed to improve the impact resistance of polyesters and thermoplastic materials. Specifically, certain core-shell polymers comprising a core made of rubbery polymer and a shell, around the core, made of a glassy polymer are excellent agents for improvement of notched impact strength of polyesters where clarity is not an object.

When these prior art methods are used, the polyester resin generally exhibits poor compatibility with the shell of the rubber-containing polymer, and therefore impact resistance (especially notched Izod impact resistance) is not fully optimized. Even when these prior art core-shell modifiers are added to amorphous polyesters and found to produce ductile, notched breaks, the clarity of amorphous polyester resins is destroyed. An amorphous polyester may contain a small amount of crystallinity, but the level must be low enough so that clarity is not adversely affected. Further, although the polyester may be crystallized under certain conditions, in the present invention the molding and cooling conditions are such that crystallization (and loss of clarity) is avoided.

Lane, U.S. Pat. No. 4,034,013 teaches core/shell polymers functionalized with an epoxy group, such as a shell of methyl methacrylate/glycidyl methacrylate, to improve the melt strength of polyesters. Although Lane broadly teaches butadiene-based elastomers with optional minor amounts of styrene in the core and teaches styrene as a major component of the outer stage, she does not teach or suggest a solution to preparing an efficient impact modifier which will retain clarity in the amorphous polyester.

Kishimoto et al., Japanese Kokai 54-48850, disclose butadiene-based core/shell polymers with hydroxyalkyl groups in the shell portion as modifiers for crystalline polyesters, such as poly(butylene terephthalate), but do not teach the means to modify such core/shell polymers to make them useful as impact modifiers in clear, amorphous polyesters.

The object of the present invention is to provide a composition for improving the impact strength of polyesters, such as PET or PET copolyesters, when they are processed into dear, tough objects while retaining their amorphous nature. The composition will provide tough, ductile notched Izod breaks (>10 ft. lbs./in., at room temperature) at loadings of 25% or less in amorphous polyesters and copolyesters. It is another objective that said composition provide tough ductile notched Izod breaks without reducing the transparency of amorphous polyesters. Another object is to provide a composition which will also overcome the embrittlement caused by physical aging which commonly occurs in amorphous aromatic polyesters when conditioned at temperatures approaching glass transition temperature (Tg). A further object is to provide a process for making an impact modifier composition for improving the impact strength of polyester. A still further object is to provide clear amorphous extrusion/melt shaped or injection molded PET or PET copolyester articles.

SUMMARY OF THE INVENTION

In the instant invention, impact strength of amorphous aromatic polyesters is increased substantially by the addition of small amounts of certain core-shell modifiers which disperse very readily in aromatic polyesters and do not detract from clarity. These and other objects as will become apparent from the following disclosure are achieved by the present invention which comprises in one aspect a composition for improving the impact strength characteristics of aromatic polyesters, such as PET in amorphous form.

The impact modifier composition of this invention is a core-shell polymer with a core comprised mainly of a rubbery core polymer such as a copolymer containing a diolefin, preferably a 1,3-diene, and a shell polymer comprised mainly of a vinyl aromatic monomer such as styrene, and hydroxyalkyl (meth)acrylate or, in the alternative, another functional monomer which acts in a manner similar to the hydroxyalkyl (meth)acrylate).

There are two general types of impact modifiers meeting this description. In the preferred case, for lowest raw material cost, is a core-shell impact modifier composition comprising:

(A) from about 40 to about 65 parts by weight of a core polymer comprising: from about 40 to about 60 percent by weight of units derived from at least one vinyl aromatic monomer, from about 60 to about 40 percent by weight of units derived from a 1,3-diene monomer, such as isoprene, 3-chlorobutadiene or butadiene, optionally, up to about 5 percent by weight of at least one cross linking or graft-linking monomer, and optionally up to about 10% by weight of units derived from at least one copolymerizable vinyl or vinylidene monomer;

(B) from about 35 to about 60 parts by weight of a shell polymer comprising: from about 2 to about 40 percent by weight of units derived from a hydroxyalkyl (meth)acrylate, and from about 60 to about 98 percent by weight of a vinyl aromatic monomer; and up to about 25 percent by weight of one or more copolymerizable vinyl or vinylidene monomers. Intermediate shells may also be present.

The second type utilizes a vinyl aromatic monomer of high refractive index chosen from the class of polybromoaromatic monomers and polycyclic aromatic monomers. Such monomers include dibromostyrene, tribromostyrene, tetrabromostyrene, monomethyldibromostyrene, vinyl naphthalene, isopropenyl naphthalene, and the like. Because these monomers are more effective in raising refractive index, they may be used in lesser amounts, allowing more diolefin to be present in the core polymer or a higher amount of core in the core/shell polymer. In this instance, the invention encompasses a core-shell impact modifier composition comprising:

(C) from about 40 to about 90 parts by weight of a core polymer comprising: from about 20 to about 60 percent by weight of units derived from at least one vinyl aromatic monomer of high refractive index, from about 40 to about 80 percent by weight of units derived from a 1,3-diene monomer, such as isoprene, 3-chlorobutadiene or butadiene, optionally from about 0.05 to about 5 percent by weight of a cross-linking monomer; and optionally up to about 10% by weight of units derived from a copolymerizable vinyl or vinylidene monomer.

(D) from about 10 to about 60 parts by weight of a shell polymer comprising: from about 2 to about 40 parts by weight derived from a hydroxyalkyl (meth)acrylate, and from about 50 to about 98 percent by weight of a vinyl aromatic monomer; and up to about 25 percent by weight of one or more copolymerizable vinyl or vinylidene monomers.

In the present invention, the hydroxyalkyl (meth)acrylate may be replaced by a monomer chosen from at least one of the group consisting of epoxyalkyl (meth)acrylates, (meth)acrylonitrile, cyanoalkyl (meth)acrylates, cyanoalkoxyalkyl (meth)acrylates, monomers containing an allyl group and a hydroxyl group, and vinylaromatic monomers containing at least one hydroxyl group, preferably nonphenolic.

A further variation of the impact modifier structure is to form a three-stage polymer with a hard-core comprising at least 80 percent of units derived from at least one vinyl aromatic monomer. This hard-core may have units derived from a diene monomer, such as butadiene, or from other copolymerizable vinyl or vinylidene monomers. The hard-core may contain up to about 5 percent by weight of units derived from at least one graft-linking or cross-linking monomer. The hard-core may be from about 10 to about 50 weight percent of the total impact modifier. The hard-core technology, based on U.S. Pat. Nos. 3,793,402 and 3,971,835, offers a means to add a vinyl aromatic monomer to adjust the refractive index upwards without requiring that monomer to be copolymerized with the diene monomer and thus adversely affect the rubbery characteristics of the copolymer.

Another aspect of the invention is the blending of the impact modifier composition with at least one aromatic polyester and/or copolyester at a weight ratio of about 99/1 to about 70/30 of polyester/impact modifier, the polyester remaining amorphous. A still further aspect of the invention comprises molded parts, bottles, sheet, films, pipes, foams, containers, profiles, or other articles prepared in accordance with the above-mentioned compositions and blends.

DETAILED DESCRIPTION OF THE INVENTION

It has been found that certain core-shell impact modifiers produce clear, and unexpectedly tough blends with amorphous aromatic polyesters. These modifiers produce a large increase in impact strength, while maintaining excellent optical clarity of the polyesters. These modifiers have cores composed principally of rubbery polymers, such as copolymers of diolefins with vinyl aromatic monomers, such as copolymers of butadiene with styrene, and shells composed principally of vinyl aromatic copolymers (e.g. styrene/hydroxyalkyl (meth)acrylate copolymers). For example, the vinyl aromatic core-shell impact modifiers (i.e. "modifiers") which give this unexpected result contain shells derived from copolymers of vinyl aromatic monomers with certain hydroxyalkyl (meth)acrylates, for example, hydroxyethyl (meth)acrylate (HEMA), hydroxypropyl (meth)acrylate (HPMA), 4-hydroxybutyl acrylate, ethyl alpha-hydroxymethylacrylate, or hydroxyethyl acrylate (HEA), or other copolymerizable monomers containing one or more hydroxyl groups, such as allyl cellosolve, allyl carbinol, methylvinyl carbinol, allyl alcohol, methallyl alcohol, and the like. Also included are other monomers which function in a similar manner, for example, glycidyl methacrylate (GMA), 3,4-epoxybutyl acrylate, acrylonitrile, methacrylonitrile, beta-cyanoethyl methacrylate, betacyanoethyl acrylate, cyanoalkoxyalkyl (meth)acrylates, such as omega-cyanoethoxyethyl acrylate, or omega-cyanoethoxyethyl methacrylate, (meth)acrylamides, such as methacrylamide or acrylamide, N-monoalkyl (meth)acrylamides, such as N-methylacrylamide or N-t-butylacrylamide or N-ethyl (meth)acrylamide, or vinyl monomers containing an aromatic ring and an hydroxyl group, preferably nonphenolic, such as vinylphenol, para-vinylbenzyl alcohol, meta-vinylphenethyl alcohol, and the like. Styrene homopolymer and other styrene copolymers and terpolymers, such as styrene/methyl methacrylate are very much less effective.

The monomer concentrations in the cores and shells of the modifier composition are adjusted to provide a refractive index (RI) to match that of the polyesters with which they are blended (i.e. about 1.55 to about 1.58). This produces a clear blend under processing conditions which will maintain the polyester in its amorphous form Almost all rubbery polymers (e.g. core polymers) have RI's well below this range. Therefore it is necessary that the rubber phase concentration of the impact modifier composition be kept relatively low and the other components of the modifier be used to bring the RI into the desired range. However, the impact strength obtainable with a given concentration of any core-shell impact modifier tends to vary directly with the amount of rubber polymer in the modifier. This means that high RI modifiers having low rubber contents have to be exceptionally efficient to produce good toughening.

From a practical standpoint the most desirable monomer to produce rubbery polymer for this application is butadiene whose homopolymer has a RI=1.52. It has the best combination of RI, cost, stability, and processability. For the same reasons, styrene is the most desirable component for the rest of the modifier. However, even if butadiene and styrene were the only components of the modifier, a butadiene/styrene ratio ranging from about 50/50 to 20/80 would be required for the modifier RI to be in the 1.55 to 1.58 range needed for matching the RI's of amorphous, aromatic polyesters. One skilled in the art of impact modification would expect a 50% concentration of butadiene to be very low for good core-shell impact modifier efficiency. The results found herein for modification of polyesters with such functionalized "rubber-poor" modifiers are surprisingly good.

In response to the need to match RI's of amorphous aromatic polyesters and simultaneously have excellent impact modifier efficiency, it was unexpectedly discovered that when low concentrations of certain hydroxyalkyl (meth)acrylates are copolymerized with aromatic vinyl monomers to form the shell polymer of core-shell impact modifiers having RI's in the 1.55 to 1.58 range, very high notched Izod impact strengths are obtained with amorphous polyesters at 30% or lower modifier loadings, and preferably at from about 5 to about 20% loadings. Substitution of the hydroxyalkyl methacrylate with other functional monomers promoting compatibility of the shell with the polyester will give similar results in impact improvement and maintenance of clarity.

The requirement for a "rubber-poor" modifier can be relaxed somewhat if the vinyl aromatic monomer is changed from styrene, vinyl toluene, para-methylstyrene, monochlorostyrene and the like to one of high refractive index, viz., the polybrominated vinyl aromatics or the polycyclic vinyl aromatics.

The core polymer in the impact modifier composition is a rubbery polymer and generally comprises a copolymer of butadiene and a vinyl aromatic monomer. The rubbery polymer may include diene rubber copolymers (e.g., butadiene-styrene copolymer, butadiene-styrene-(meth)acrylate terpolymers, butadiene-styreneacrylonitrile terpolymers, isoprene-styrene copolymers, etc.). Of the aforementioned rubbery polymers, those which can be produced as a latex are especially desirable. In particular, a butadiene-vinyl aromatic copolymer latex obtained as a result of emulsion polymerization is preferred. In the core polymer, a partially crosslinked polymer can also be employed if crosslinking is moderate. Further, at least one of a cross- or graft- linking monomer, otherwise described as a multi-functional unsaturated monomer, can also be employed. Such monomers include divinylbenzene, diallyl maleate, butylene glycol diacrylate, allyl methacrylate, and the like.

The ratio of comonomers in the core depends on the desired core-shell ratio and hardness of the rubber phase. The ratio range of butadiene to the vinyl aromatic in the core polymer is 70/30 to 40/60 (parts by weight). If the quantity added is below 40 parts by weight butadiene, it is difficult to improve the impact resistance. If the quantity added exceeds 70 parts by weight butadiene on the other hand, it is difficult to obtain a high enough RI modifier to match that of the polyester, unless the vinyl aromatic monomer is of high refractive index and selected from the polybrominated or polycyclic monomers described above. Optionally, a small concentration, from about 0.01 up to about 5, and preferably from about 0.1 up to about 2 percent, by weight of a crosslinking monomer, such as divinyl benzene or butylene glycol dimethacrylate is included, and optionally about 0.01 to about 5 percent by weight of a graftlinking monomer for tying the core and shell together, such as allyl maleate may be included in the rubbery core polymer. Further examples of crosslinking monomers include alkanepolyol polyacrylates or polymethacrylates such as ethylene glycol diacrylate, ethylene glycol dimethacrylate, butylene glycol diacrylate, oligoethylene glycol diacrylate, oligoethylene glycol dimethacrylate, trimethylolpropane diacrylate, trimethylolpropane dimethacrylate, trimethylolpropane triacrylate or trimethylolpropane trimethacrylate, and unsaturated carboxylic acid allyl esters such as allyl acrylate, allyl methacrylate or diallyl maleate.

As the shell polymer of the impact modifier composition, a hydroxyl-group-containing monomer is preferred to be employed. When a hydroxyl group is introduced to the shell polymer, a vinyl monomer containing an active double-bond segment and a hydroxyl group (hereafter referred to as hydroxyl-group-containing monomer) is copolymerized with another copolymerizable vinyl monomer. Examples of the aforementioned hydroxyl-group-containing monomers include hydroxyalkyl (meth)acrylate or alpha-hydroxymethylacrylate esters, such as hydroxyethyl (meth)acrylate, hydroxypropyl (meth)acrylate, or ethyl hydroxymethylacrylate, allyl derivatives of hydroxyl-group containing compounds, such as allyl cellosolve, allyl carbinol, methylvinyl carbinol, allyl alcohol, methallyl alcohol, and the like, vinylphenol, para-vinylbenzyl alcohol, meta-vinylphenethyl alcohol, and the like.

Although the hydroxyalkyl (meth)acrylate monomers are preferred for reasons of safety in handling (over the nitrile-containing monomers) or availability (over other monomers taught herein), other monomers which function in a similar manner may be employed, for example, glycidyl methacrylate (GMA), 3,4-epoxybutyl acrylate, acrylonitrile, methacrylonitrile, beta-cyanoethyl methacrylate, beta-cyanoethyl acrylate, cyanoalkoxyalkyl (meth)acrylates, such as omega-cyanoethoxyethyl acrylate, or omega-cyanoethoxyethyl methacrylate, (meth)acrylamide, or N-monoalkyl (meth)acrylamide and the like.

Vinyl monomers to be copolymerized with the aforementioned hydroxyl-group-containing monomers include vinyl aromatic monomers such as styrene, alpha-methyl styrene, para-methyl styrene, chlorostyrene, vinyl toluene, dibromostyrene, tribromostyrene, vinyl naphthalene, isopropenyl naphthalene, and the like. The hydroxyl-group-containing monomers and vinyl aromatic monomers may be used either singly or in combination of two or more.

In the shell polymer, the ratio between the hydroxyl-group-containing monomer (e.g. HEMA, HPMA) or a monomer which performs in a similar manner (e.g. MAN, AN, or GMA), and the other copolymerizable vinyl monomers (e.g. styrene, tribromostyrene) ranges from 2/98 to 40/60 parts by weight, and preferably 3/97 to 30/70 parts by weight. Below 2 parts, the performance is not improved over the vinyl aromatic homopolymer shell, and above that level, side reactions, such as crosslinking, may occur, with adverse effects on dispersion.

Optionally, one or more additional monomers may be added to the shell to adjust the RI. This additional monomer is preferably an alkyl (meth)acrylate (such as $C_1$–$C_4$ alkyl (meth) acrylate, and the like), but it can be any monomer which copolymerizes with the other two monomers used in the core polymer and produces a terpolymer which permits the RI of the modifier to match that of the polyesters with which it is blended.

The additional monomer may include one or more of any of the following monomers: acrylonitrile, methacrylonitrile, methyl acrylate, ethyl acrylate, propyl acrylate, butyl acrylate, 2-ethylhexyl acrylate, decyl acrylate, methyl methacrylate, ethyl methacrylate and the like.

In the impact modifier composition, the ratio of the core polymer to the shell polymer ranges from about 90/10 to about 40/60, and preferably especially when styrene is the vinyl aromatic monomer from about 60/40 to about 40/60 (parts by weight). The resultant composition preferably has a particle size range of about 75 to about 300 nm., more preferably from about 140 nm. to about 230 nm., and a RI range of about 1.55 to about 1.58.

When the impact modifier composition containing 40–90 parts by weight of the aforementioned rubbery core polymer and 60–10 parts by weight of the shell hydroxyl-group-containing polymer (total: 100 parts by weight) is manufactured, conventional methods for manufacturing ordinary rubber-modified polymers (e.g., ABS resin, impact resistant polystyrene, etc.) may be effectively employed. These impact modifiers may be prepared by emulsion polymerization. The preferred procedure is emulsion polymerization using soaps, initiators and processing conditions normally used for making MBS polymers, that is, impact modifiers based on butadiene-styrene rubbers with one or more stages of styrene or methyl methacrylate polymers. Isolation from the emulsion can be achieved by standard procedures such as spray drying or coagulation. For example, a polymer latex characterized by an appropriate particle size and degree of conversion is produced by means of emulsion polymerization (e.g. copolymerizing a hydroxyl-group-containing monomer with another copolymerizable vinyl monomer in the presence of a polymerized rubber latex).

Further, the polymer can be prepared by a method wherein a core polymer is uniformly graft-polymerized with a hydroxyl-group-containing monomer and another copolymerizable vinyl monomer constituting the shell polymer, but also by a method wherein the core polymer is partially graft-polymerized with the vinyl monomer and/or hydroxyl-group-containing monomer, wherein a copolymer, such as that described in U.S. patent application Ser. No. 755,701, filed Sep. 18, 1991 for which two of the present inventors are inventors and which also is assigned to the same assignee as the present application, is produced by copolymerizing the remainder of the vinyl monomer and/or hydroxyl-group-containing monomer and the two are finally mixed. In such a case, an impact modifier composition which provides an extremely high impact resistance can be obtained if the following composition is employed. For example: 50–80 parts by weight (solid content) of the rubbery polymer latex are emulsion graft-polymerized with 50–20 parts by weight of hydroxyl-group-free vinyl monomer. Next, a hydroxyl-group-containing monomer is separately emulsion-polymerized with a vinyl monomer identical to that used for the aforementioned emulsion graft polymerization or a different vinyl monomer which yields a copolymer with a high affinity with said graft polymer. The resulting core polymer latex and the side-chain hydroxyl-group-containing shell polymer latex are then mixed in latex form prior to isolation. The advantage to this method is that higher molecular weight polymer can be produced in the absence of the butadiene-containing rubber, and the higher molecular weight component may be more effective in improving rheological properties, such as blow molding. Further, such allows for intimate mixing prior to blending with the polyester.

Thus, when the impact modifier composition is manufactured, general free radical polymerization techniques (e.g., emulsion polymerization, solution polymerization, and suspension polymerization) may be employed so long as the resulting impact modifier composition is characterized by a core-shell structure wherein hydroxyl groups are preserved.

The impact modifier composition may be isolated from the reaction medium by any of several known processes. For example, when prepared in emulsion, the composition may be isolated by coagulation, including coagulation in an extruder from which the water is removed as a liquid, or by spray-drying. Additives such as thermal stabilizers and anti-oxidants may be added to the composition prior to, during or after, isolation.

It is important that no crystallization promoter is present in the composition since this invention is directed to compositions suitable for producing amorphous, non-crystalline articles. If substantial crystallization occurs in the process, the resultant articles become opaque and brittle. In some cases, such as with pipe, foam and profile extrusion, a small degree of crystallinity may be acceptable and can be achieved by control of the cooling cycle. However, in most cases it is preferred to prepare amorphous articles on standard injection molding and extrusion equipment. The type of articles to be produced, whether it be molded parts, bottles, films, foams, pipes, tubing, sheet or profiles, will govern the auxiliary equipment to be employed. For instance, to produce bottles, extrusion blow molding equipment is necessary. To produce film, blown film equipment is necessary.

The amorphous, aromatic polyesters, such as PET, and copolyesters, such as Eastman PETG (i.e., (poly-)ethylene-co-1,4-cyclohexanedimethylene terephthalate), of this invention include poly ($C_1$ to $C_6$ alkylene terephthalates), alkylene naphthalene dicarboxylates, such as poly(ethylene naphthalene-2,6-dicarboxylate), and aromatic amorphous polyester which contains units derived from at least one aliphatic diol or cycloaliphatic diol or combinations of aliphatic diols and cycloaliphatic diols and one or more aromatic dibasic acids. Examples include polyethylene terephthalate (PET), polypentylene terephthalate, and the like, or an aromatic copolyester which contains units derived from two glycols (e.g., ethylene glycol, and cyclohexanedimethanol) or from two dibasic acids (e.g. terephthalic acid and isophthalic acid). Such polyesters may be obtained by polycondensing polyol components (e.g., ethylene glycol) with dicarboxylic acid components (e.g., terephthalic acid, isophthalic acid, naphthalenedicarboxylic acid, etc.), as well as mixtures consisting of two or more polyesters.

The modifiers and polyesters may be combined by melt blending in an extruder. The polyesters should be dried to 0.03% moisture content. A mix of the two components can be directly extruded or molded or the components can be combined in an initial blending step and the pellets from this blend can then be molded after drying to a 0.03% moisture content. The concentration of modifier in these polyester blends can range from about 1 to about 30% by weight and preferably from about 5 to about 20% by weight. The blends can be extruded or molded into clear parts which have very high notched impact strength, and exhibit ductile type failures and physical aging resistance. The required modifier concentration will depend on factors such as the molecular weight of the polyester, the impact strength desired, and the temperature at which the final object is utilized. Below 1% modifier concentration, no significant effect is seen.

Blends should contain amorphous aromatic polyester or copolyester which has an intrinsic viscosity of greater than or equal to 0.7 dl/g. for best properties of molding and processing, but for some uses, lower molecular weight polyesters may be employed. (PET or PETG may decrease in intrinsic viscosity after melt processing; the values in the specification refer to the polyester as supplied, prior to processing). Articles such as containers, bottles, foam, or hollow parts may be extrusion blow molded, extruded or injection molded from polyester blends described herein.

Blending can be accomplished by melt extrusion in an extruder at temperatures of about 193° C. to about 288° C., preferably about 204° C. to about 265° C. For example, a high work, two stage screw which has a length-/diameter ratio of about 24/1, and a compression ratio of about 3.0 to 3.5 gives a very adequate dispersion of the modifier in the polyester. A dwell time in the extruder of 1 to 5 minutes is adequate to insure complete mixing or dispersion under most conditions but of course lower and higher dwell times can certainly be used. Preferably the strands produced by extruder blending are pelletized and dried to a moisture content of less than 0.03 percent before molding.

The ingredients used to make the composition of the invention are dispersed uniformly and it has been found that melt blending the ingredients, by using such equipment as a melt extruder (e.g., single screw extruders or twin screw extruders) in a separate step prior to molding is desirable. The blended product may be pelletized (i.e., the extruded strand is quenched and cut), dried and used for subsequent molding purposes.

Other additives known in the art may be included in the composition at about 1 to about 30% by weight. These other additives may include antioxidants, flame retardants, reinforcing agents such as glass fiber, asbestos fiber and flake, mineral fillers, stabilizers, nucleating agents, ultraviolet light stabilizers, heat and light stabilizers, lubricants, dyes, pigments, toners, mold release agents, fillers, such as glass beads and talc, and the like. Minor amounts of other polymers (i.e. about 1 to about 10 percent by weight) can also be incorporated in the present composition, such as polyamides or polycarbonates. Most of these additives will adversely affect clarity. The additives listed above such as antioxidants, thermal stabilizers, fillers, pigments and flame retardant additives may be used in the composition of this invention provided they do not exert any adverse effect on the impact strength or clarity. It is preferred not to have glass fiber reinforcement in clear article applications or any additive which would decrease transparency. It is highly preferred that clear articles are produced.

The polyesters must be thoroughly dried prior to melt processing to minimize the rapid hydrolytic degradation known to occur at processing temperatures and to reduce molecular weight. The modifiers of the present invention are much less sensitive to hydrolytic degradation than the polyesters. Higher than necessary melt temperatures should be avoided during processing to keep the impact strength as high as possible. Melt cooling should be carried out as rapidly as possible to prevent polyester crystallization and the loss of clarity.

Aromatic amorphous polyesters are quite sensitive to embrittlement from physical aging, but this limitation is overcome by the modifiers herein (see Table II). Therefore, polyester blends will now be able to compete successfully with polycarbonate, cellulosics, impact modified polyvinyl chloride, and the like for a broad range of applications where high clarity and toughness are needed in the absence of exceptional heat resistance.

The preferred poly(alkylene terephthalates) are polyethylene terephthalate (PET) and copolyesters of PET. Blends with other polyesters are also suitable. For example, blends of two or more polyesters may also be used, with polyester blends which have poly (ethylene terephthalate) being preferred.

EXAMPLES

The following examples and comparative examples are presented to illustrate the invention, but the invention should not be limited by these examples. All parts and percentages are by weight unless otherwise indicated, and the following abbreviations are employed in the examples and throughout the text:

BA=butyl acrylate
EA=ethyl acrylate
ST=styrene
HEMA=hydroxy ethyl methacrylate
MMA=methyl methacrylate
MAA=methacrylic acid
HPMA=hydroxy propyl methacrylate
GMA=glycidyl methacrylate
PET=poly(ethylene terephthalate)
PBT=poly(butylene terephthalate)
BD=butadiene
DVB=divinyl benzene
BZMA=benzyl methacrylate
AN=acrylonitrile
MAN=methacrylonitrile Apparatus and General Procedure Standard ASTM test specimen molds are employed. Refractive indexes are determined according to ASTM-D-524, light transmission and haze according to ASTM-D-1003, and notched Izod impact strength according to ASTM-D-256. The modifiers are prepared by emulsion polymerization of butadiene with styrene and about 0.6% divinyl benzene. After this step was complete, styrene with HEMA or another comonomer is added to the emulsion and polymerized to form a shell stage on the butadiene rich core stage. The core-shell impact modifier polymer is then isolated front the emulsion by spray drying.

The impact modifiers described herein have particle sizes in the 180–240 nm range. The modifier is combined with aromatic polyester resins by melt blending in an extruder. Strands of the blends are quenched in a water bath as they leave the extruder to prevent polyester crystallization. Blends in which the RI's of the modifier and polyester are equal form clear strands. Pellets cut from the strands are injection molded into test specimens under conditions which prevent polyester crystallization. The test specimens are then evaluated for physical properties. It should be noted that notched Izod impact Strengths greater than about 10 ft.lbs/in. (ca. 540 J/m) usually exhibit ductile rather than brittle breaks. Also all the ⅛" (3.2 mm.) molded plaques prepared with modified PETG are transparent so that distant objects could be clearly seen through them even though the measured haze values ranged from about 7 to about 45%.

These results in Table I clearly show the effectiveness of modifiers with styrene/HEMA shells vs. shells with styrene, or styrene and other monomers. In ⅛" (3.2 mm.) thick samples, ductile failures (desirable) were observed at modifier loadings as low as 10%, and in three cases at a temperature of 10° C. (20% loading). Also some blends produced ¼" (6.4 mm.) thick samples which gave ductile breaks. Unmodified polycarbonate, generally conceded to be the toughest clear polymer, exhibits only brittle breaks at ¼" (6.4 mm.) thickness.

The modifiers in the Tables are prepared by emulsion polymerization. The impact modifiers are blended with polyester in a 1 inch, 24/1 length/diameter ratio, single screw extruder at the concentrations (i.e. modifier loading (%)) listed in Table I. Impact strength is determined by ASTM-D-256. Table I describes the effect of different impact modifiers (butadiene/styrene//styrene/HEMA) on the impact strength of a commercial copolyester resin, Eastman's PETG 6763, with a 0.74 dl/g intrinsic viscosity (IV) (ASTM D-4603), and another commercial copolyester, Eastman's Tenite 13339, with a 1.05 dl/g IV (ASTM D-4603). Many of the impact modifiers have RI's approximating those of the polyesters or copolyesters so that clear strands were extruded. Exact RI matches can be achieved by slightly adjusting the impact modifier Compositions with HPMA or GMA replacing HEMA may be employed with similar results.

Table I lists the compositions of a series of core-shell impact modifiers with RI's of about 1.565 except for Example 11 (lower) and Example 15 (higher). Modifiers are melt blended at the concentrations listed in the table with Eastman's PETG 6763, a non-crystallizable PET copolyester in which part of the ethylene glycol (EG) component is replaced with cyclohexane dimethanol (CHDM), having a RI=1.565. These blends and unmodified PETG are molded into ⅛" and ¼" (3.2 mm. and 6.4 mm.) thick notched Izod impact test (ASTM-D-256) specimens and into 2"×3"×⅛" (50.8×76.2×3.2 mm.) plaques. The impact test results are determined by ASTM D-256 on ⅛' and on ¼" (3.2 mm. and 6.4 mm.) thick bars. Values for transparency and haze are determined on the ⅛" (3.2 mm.) thick plaques.

Two blends with Modifiers 12 and 15 are prepared with Eastman's Tenite 13339 copolyester. This resin contains less CHDM than PETG and its composition is therefore much closer to that of PET than is PETG. It has an RI of 1.575. Since the modifier of Example 12 blended with it had an RI of only about 1.565, the RI mismatch caused the plaques to be translucent rather than transparent. The modifier of Example 15 with a RI of 1.575 gives a blend of low haze.

Example 1

A 15 g charge of a 10% aqueous solution of acetic acid was added to 5244.4 g of deionized water in a stainless steel reactor capable of withstanding 200 psi (1.38 mPa) pressure. The solution was heated to 80° C. while stirring and sparging with nitrogen for 30 minutes. The temperature was raised to 85° C. and 360 g of a 10% aqueous solution of sodium formaldehyde sulphoxylate were added along with a 50 g rinse of deionized water. A mixture of 611.4 g of styrene (ST) and 30 g of divinyl benzene (DVB) were next added along with 2358.6 g of butadiene (BD) and 240 g of a 10% aqueous solution of sodium dodecyl benzene sulfonate over a 3 hour period. A 357.5 charge of a 1.4% aqueous solution of t-butyl hydroperoxide (tBHP) was added over a 6 hour period. At the end of this addition, the feed line was rinsed with a sufficient amount of deionized water to obtain an emulsion containing 33% solids. The emulsion was cooled to room temperature and stored for subsequent use as a seed for the following modifier examples.

Example 2

A 18.2 g charge of a 10% aqueous solution of acetic acid was added to 5800 g of deionized water in a reactor. This was sparged with nitrogen while it was heated to 95° C. When the temperature reached 95° C., the nitrogen was turned off and 532.5 g of the emulsion (solids basis) front Example 1 and 337.3 g of a 5% aqueous solution sodium formaldehyde sulphoxylate were added to the reactor. About 350 g of deionized water was used as a rinse. The reactor was then evacuated to 5" (0.17 mdynes/cm$^2$) of mercury. Next a mixture of 2020.8 g of ST and 42.2 g of DVB were added at a constant rate to the reactor over a 5 hour period. At the same time 590.2 g of a 10% aqueous solution of Dowfax 2A-1 and 2241.3 g of BD were added at a constant rate over the same 5 hour period. At the same time, 695.6 g of a 1.4% aqueous solution of tBHP was added over a 7.25 hour period. At the end of the monomer feed, 227 g of rinse water were added. At the end of the tBHP feed, the reaction was held for 30 minutes. After this the reactor was cooled to 62° C. and vented to atmospheric pressure. This completed the preparation of the emulsified core of the modifier.

The shell of the modifier was prepared by first adding 109.8 g of a 5% aqueous solution of sodium formaldehyde sulphoxylate to the reactor containing the core emulsion. A nitrogen sweep of the reactor was started. A mixture of 2574 g of ST and 390.2 g of hydroxyethyl methacrylate (HEMA) was prepared and sparged with nitrogen for 20 min. This mixture was fed to the reactor, maintained at 60° C., for 90 minutes along with 288.9 g of a 1.4% solution of tBHP. At the end of this feed the reaction was held for 15 minutes and then chased for 4 hours with 183.1 g of a 1.4 % aqueous solution of tBHP and 87.9 g of a 5% aqueous solution of sodium formaldehyde sulphoxylate. At the end of this chase, a 50% solids emulsion containing 30.1 g of trisnonyl phenyl phosphite, 30.1 g of triethylene glycol bis(3-(3'-t-butyl-4'hydroxy-5'methylphenyl)propionate) (Irganox 245, Ciba Geigy Co.) and 90.3 g of dilauryl thiodipropionate was added.

The emulsion was then spray dried. A fine powder having a refractive index (RI) of 1.565 was obtained. This powder was melt blended in a single screw extruder at an average melt temperature of 240° C. with Kodar PETG 6763, a PET copolyester supplied by Eastman Chemical Co., which contains cyclohexanedimethanol substituted for part of the ethylene glycol. This copolyester has an RI of 1.565. Extruded strands of the blend were pelletized, dried for 8 hours at 60° C. and injection molded into test specimens. Notched Izod impact tests were run according to ASTM Procedure D-256 and light transmission and haze tests were run on 32 mm thick test specimens according to ASTM Procedure D-524. Results from these tests and tests run on the following examples are listed in Table I. Some blends were also prepared with Eastman Chemical Co.'s Tenite 13339, a PET resin containing less than 10% isophthalic acid substituted for terephthalic acid and having an intrinsic viscosity of 1.05 dl/g.

Example 3

This modifier was prepared in the same way as Example 2 except that 2433.6 g of ST and 530.5 g of HEMA were used to prepare the modifier shell.

Example 4

This modifier was prepared in the same way as Example 2 except that 2730 g of ST and 234 g of HEMA were used to prepare the modifier shell.

Example 5

This modifier was the same as Example 2 except that the shell consisted of 2371.2 g of ST, 296.4 g of HEMA and 296.4 g of ethyl acrylate.

Example 6

This modifier was the same as Example 2 except that hydroxypropyl methacrylate was substituted for the HEMA.

The following four examples compare results obtained with modifiers having the same cores as those in the examples above and RI's about equal to those of the above modifiers but with shells that do not fall within the claims of this application.

Example 7

This modifier was the same as the one in Example 2 except that the ST charge used in making the core was 2122.2 g and the BD charge for the core was 2373.9 g. The shell consisted of 2552 g of ST. No comonomer was used in preparing the shell.

Example 8

This modifier was the same as Example 2 except that the shell was prepared with 2652 g of ST, 156 g of methyl methacrylate and 156 g of ethyl acrylate. No HEMA was present.

Example 9

This modifier was the same as Example 2 except that the shell consisted of 2652 g ST, 156 g of methyl methacrylate and 156 g of methacrylic acid. No HEMA was present.

Example 10

This modifier was the same as Example 2 except that the shell was composed of 1560 g of ST and 1404 g of benzyl methacrylate.

Example 11

The modifier used in this example was Paraloid EXL3647, an MBS type commercial impact modifier supplied by Rohm and Haas Co. This modifier has a RI of 1.525 which is well below the RI's of aromatic polyesters and copolyesters. Although this modifier produced good notched impact strength, it also produced blends which were opaque.

Example 12

This modifier was equivalent in composition to Example 2 but it was prepared by a different process. The difference was in the rate of addition of the ST/DVB mix and of the BD used in preparing the core. These two components were added according to the following schedule:

| First hour  | ST/DVB | 12.7 g/min. | BD | 1.2 g/min. |
| Second hour | ST/DVB | 9.1 g/min.  | "  | 4.9 g/min. |
| Third hour  | ST/DVB | 7.0 g/min.  | "  | 7.1 g/min. |
| Fourth hour | ST/DVB | 4.2 g/min.  | "  | 9.8 g/min. |
| Fifth hour  | ST/DVB | 1.4 g/min.  | "  | 12.7 g/min.|

At the end of this monomer feed, the process and components used were the same as those in Example 2.

Example 13

This modifier was the same as Example 12 except that the shell consisted of 2371.2 g of ST, 296.4 g of HEMA and 296.4 g of ethyl acrylate.

Example 14

This modifier had the same overall composition as Example 2 except that the seed polymer contained a high level of ST. This seed polymer was prepared in the same manner as Example 1. After the reactor was charged with 5244.4 g of deionized water and 15 g of a 10% aqueous solution of acetic acid, it was heated to 90° C. while stirring and sparging with nitrogen for 30 minutes. When the temperature reached 90° C., 360 g of a 10% aqueous solution of sodium dodecyl benzene sulfonate and 182 g of a 5% aqueous solution of sodium formaldehyde sulphoxylate were added. Next a mixture of 2970 g of ST and 30 g of DVB, a 2358 g charge of BD and a 240 g charge of a 10% aqueous solution of sodium dodecyl benze sulfonate were added over 3 hours. A 367.5 g charge a 1.47% aqueous solution of tBHP was added over 4 hours. At the end of the feed, the lines were rinsed with deionized water to produce a 33% solids emulsion.

The procedure used for the rest of the preparation was the same as that used for Example 12 except that the above emulsion was substituted for the Example 1 emulsion used in Example 12 and the monomer charge for making the core was 182.4 g of ST, 44.3 g of DVB and 2425.5 g of BD. All other components used in both the core and the shell and the procedure used were the same as for Example 12.

Example 15

This modifier was the same as Example 12 except that the shell consisted of 2027.4 g of ST, 296.4 g of HEMA and 640.2 g of vinyl naphthalene to give a modifier with a RI of 1.575.

Example 16

This example shows blends of PETG and of PET and impact modifiers of the present invention, which blends show retained impact strength after a heat aging process which greatly lowers the impact strength of the unmodified polyester. Polymer A: a PET with less than 570 isophthalic acid, ($\eta$)=0.90 dl/g; Polymer B=PETG (Eastman 6763), described in the previous table; Modifier C is the modifier of Example 12, viz., 34.1 Bd/27.3 St/0.6 DVB//33 St/5 HEMA. Samples are molded and tested as molded and after aging at condition D=5 days at 60° C. or condition E=30 days at 65° C. Data are shown in Table 2.

TABLE 1

IMPACT STRENGTH AND OPTICAL PROPERTIES OR POLYESTER//IMPACT MODIFIER BLENDS

| Blend Modifier Ex. No. | Polyester | Modifier Conc. (%) | Modifier RI | Notched Izod Impact Strength of Blend (Joules/M) | | | | Transparency Haze (%/%) |
|---|---|---|---|---|---|---|---|---|
| | | | | 3.2 mm Thick Specimen | | | 6.4 mm | |
| | | | | 22° C. | 10° C. | 0° C. | 22° C. | |
| No modifier | PETG 6763[1] | 0 | — | 101.4 | 69.4 | 58.7 | 69.4 | 86/2 |
| 2 | " | 20 | 1.565 | 1072.9 | 165.5 | 80.1 | 838.1 | 78/30 |
| 2 | " | 15 | 1.565 | 1142.3 | 170.8 | 37.4 | 784.7 | 79/29 |
| 2 | " | 10 | 1.565 | 1185.0 | 117.4 | 69.4 | 138.8 | 82/15 |
| 3 | " | 20 | — | 1094.3 | 133.5 | 80.1 | 181.5 | 76/44 |
| 4 | " | 20 | 1.566 | 1131.7 | 1072.9 | 117.4 | 998.2 | 79/34 |
| 5 | " | 20 | 1.564 | 122.8 | 85.4 | 48.0 | 85.4 | 74/51 |
| 6 | " | 20 | 1.565 | 250.9 | 90.7 | 80.1 | 149.5 | 80/26 |
| 7 | " | 20 | 1.562 | 58.7 | — | — | — | 72/25 |
| 8 | " | 20 | 1.564 | 133.5 | — | — | — | 76/13 |
| 8 | " | 30 | 1.564 | 144.1 | — | — | — | — |
| 9 | " | 20 | 1.565 | 69.4 | — | — | — | 77/8 |
| 10 | " | 20 | 1.564 | 117.4 | — | — | — | 79/10 |
| 11 | " | 20 | 1.525 | 763.3 | — | — | — | opaque |
| 12 | " | 20 | 1.565 | 1158.3 | 1147.7 | 1121.0 | 1056.9 | 78/31 |
| 13 | " | 20 | 1.564 | 1334.5 | 154.8 | 96.1 | 154.8 | 76/33 |
| 14 | " | 20 | — | 1387.8 | 1121.0 | 1121.0 | — | 65/18 |
| No modifier | Tenite 13339[2] | 0 | — | 26.7 | — | — | — | 80/4 |
| 12 | " | 20 | 1.565 | 976.9 | 160.1 | 138.8 | 224.2 | translucent |
| 15 | " | 20 | 1.575 | 1019.6 | — | — | — | 76/56 |

[1]Eastman Chemical Co. - PET copolyester, contains about 30% cyclohexanedimethanol substituted for ethylene glycol, r.i. 1.565.
[2]Eastman Chemical Co. - PET containing <10% isophthalic acid. IV = 0.95 dl/g; r.i. = 1.575

TABLE 2

Physical Aging Data

| Polymer | Dart Impact, Joules | | Notched Izod, Joules/m | |
|---|---|---|---|---|
| | As molded | Condition D | As molded | Condition E |
| A | 45.2 | 2.9 | | |
| A/C = 85/15 | 48.1 | 45.0 | | |
| B | 68.0 | 43.9 | 48 | 42.7 |
| B/C = 85/15 | 60.1 | 60.7 | 1228 | 1142 |

We claim:

1. A core-shell impact modifier composition comprising:
   (a) from about 40 to about 65 parts by weight of a core polymer comprising from about 40 to about 60 percent by weight of units derived from a vinyl aromatic monomer, from about 40 to about 60 percent by weight of units derived from at least one 1,3-diene, up to about 10 percent by weight of units derived from at least one copolymerizable vinyl or vinylidene monomer, and up to about 5 percent by weight of at least one graft-linking or cross-linking monomer;
   (b) from about 35 to about 60 parts by weight of a shell polymer comprising from about 2 to about 40 percent by weight of units derived from at least one of units derived from the group consisting of, cyanoalkyl (meth)acrylates, cyanoalkoxyalkyl (meth)acrylates, (meth)acrylamide, N-monoalkyl (meth)acrylamide, vinylaromatic monomers containing at least one hydroxyl group, and monomers containing an allyl group and an hydroxyl group, from about 60 to about 98 percent by weight of units derived from at least one vinyl aromatic monomer, and up to about 25 percent by weight of units derived from one or more copolymerizable vinyl or vinylidene monomers, the core-shell impact modifier having a refractive index of from about 1.55 to about 1.58.

2. The composition of claim 1 wherein the cyanoalkyl (meth)acrylate is beta-cyanoethyl methacrylate or beta-cyanoethyl acrylate.

3. The composition of claim 1 wherein the cyanoalkoxyalkyl (meth)acrylate is omega-cyanoethoxyethyl methacrylate or omega-cyanoethoxyethyl acrylate.

4. The composition of claim 1 wherein the (meth)acrylamide is methacrylamide.

5. The composition of claim 1 wherein the N-monoalkyl(meth)acrylamide is N-methylacrylamide or N-t-butylmethacrylamide.

6. The composition of claim 1 wherein the vinylaromatic monomer of the shell polymer is para-vinylbenzyl alcohol.

7. The composition of claim 1 wherein the vinyl aromatic monomer is styrene, para-methyl styrene, chlorostyrene, vinyl toluene, bromostyrene, dibromostyrene, tribromostyrene, isopropenyl naphthalene, or vinyl naphthalene, and wherein the vinyl or vinylidene monomers are methyl methacrylate, ethyl methacrylate, butyl methacrylate, methyl acrylate, ethyl acrylate, or butyl acrylate.

8. A clear, amorphous blend comprising:
   (a) at least one amorphous, aromatic polyester or copolyester having a refractive index of from about 1.55 to about 1.58; and
   (b) a core-shell impact modifier composition comprising:

(1) from about 40 to about 65 parts by weight of a core polymer comprising from about 40 to about 60 percent by weight of units derived from a vinyl aromatic monomer, from about 40 to about 60 percent by weight of units derived from at least one 1,3-diene, up to about 10 percent by weight of units derived from at least one copolymerizable vinyl or vinylidene monomer, and up to about 5 percent by weight of at least one graft-linking or cross-linking monomer;

(2) from about 35 to about 60 parts by weight of a shell polymer comprising from about 2 to about 40 percent by weight of units derived from at least one of units derived from the group consisting of (meth)acrylonitrile, cyanoalkyl (meth)acrylates, cyanoalkoxyalkyl (meth)acrylates, (meth)acrylamide, N-monoalkyl (meth)acrylamide, vinylaromatic monomers containing at least one hydroxyl group, and monomers containing an allyl group and an hydroxyl group, from about 60 to about 98 percent by weight of units derived from at least one vinyl aromatic monomer, and up to about 25 percent by weight of units derived from one or more copolymerizable vinyl or vinylidene monomers, the core-shell impact modifier having a refractive index of from about 1.55 to about 1.58 at a weight ratio of about 99/1 to about 70/30.

9. The blend of claim 8 further containing about 0.1 to about 30% by weight, based on the weight of polyester and impact modifier, of one or more other additives.

10. The blend of claim 9 further containing about 1 to about 10% by weight, based on the weight of polyester and impact modifier, of one or more other polymers.

11. The blend of claim 8 wherein the aromatic polyester is a poly(alkylene terephthalate), poly(alkylene naphthalene dicarboxylate) or an aromatic polyester which contains units derived from at least one aliphatic diol or cycloaliphatic diol and at least one aromatic dibasic acid.

12. The composition of claim 11 wherein the poly(alkleneterephthalate) is polyethylene terephthalate or an aromatic copolyester which contains units derived from ethylene glycol, cyclohexane dimethanol, terephthalic acid and isophthalic acid.

13. Articles of claim 8 which are molded, extruded, or extrusion blow molded into parts, sheets, film, containers, bottles, foam, or hollow parts.

* * * * *